US008625130B2

(12) United States Patent
DeRoller

(10) Patent No.: US 8,625,130 B2
(45) Date of Patent: Jan. 7, 2014

(54) METHOD AND SYSTEM FOR AUTOMATICALLY CREATING PRINT GOVERNANCE RULES AND POLICIES

(75) Inventor: Matthew DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 937 days.

(21) Appl. No.: 12/540,941

(22) Filed: Aug. 13, 2009

(65) Prior Publication Data

US 2011/0037996 A1 Feb. 17, 2011

(51) Int. Cl.
*G06F 15/00* (2006.01)

(52) U.S. Cl.
USPC .............. 358/1.15; 358/1.1; 358/1.14; 705/8; 705/30; 705/400

(58) Field of Classification Search
USPC ................. 358/1.1, 1.15, 1.16; 705/8, 30, 400
See application file for complete search history.

(56) References Cited

U.S. PATENT DOCUMENTS

| | | | |
|---|---|---|---|
| 6,903,840 B1 | 6/2005 | Maymin et al. | |
| 7,362,461 B2 | 4/2008 | Reddy et al. | |
| 7,366,799 B2 | 4/2008 | Reddy et al. | |
| 7,818,285 B1 * | 10/2010 | Klatt et al. ..................... | 707/600 |
| 2002/0073003 A1 * | 6/2002 | Levine ............................ | 705/30 |
| 2002/0087492 A1 * | 7/2002 | Carroll et al. ................. | 705/404 |
| 2003/0074312 A1 * | 4/2003 | White ............................. | 705/40 |
| 2008/0037064 A1 * | 2/2008 | Goetz et al. ................... | 358/1.16 |
| 2008/0235158 A1 * | 9/2008 | Manchala et al. ............. | 705/400 |
| 2008/0273224 A1 * | 11/2008 | Maulsby et al. ............... | 358/1.15 |
| 2009/0009802 A1 | 1/2009 | Shaw et al. | |
| 2009/0147307 A1 | 6/2009 | Dietrich et al. | |
| 2009/0265286 A1 * | 10/2009 | Nagarajan ...................... | 705/400 |
| 2010/0312598 A1 * | 12/2010 | Huster et al. ................... | 705/8 |

OTHER PUBLICATIONS

Dazo et al., "Katun Print Software Solutions-A White Paper on Print Cost Opt. Sol.", InfoTrends, Network Doc. Sol., www.infotrends.com (May 22, 2007).
"Take Control of your Print Evolution Strategy", www.preosoftware.com/index, PREO Software Inc. (2006-2009).
European Patent Office European Search Report for EP Application No. 10171600.9, dated Feb. 16, 2012 and mailed Mar. 1, 2012.

* cited by examiner

*Primary Examiner* — Allen H Nguyen
(74) *Attorney, Agent, or Firm* — Fay Sharpe LLP

(57) ABSTRACT

A method and system for accommodating a plurality of printing systems arranged as an enterprise printing system including a memory for storing printer usage information related to a plurality of tasks performed with respect to the enterprise printing system and a processing module including a tangible processor. The tangible processor is manipulate to (1) analyzing the printer usage information and (2) responsive to said analyzing, automatically generating, at selected time intervals, at least one print governance rule, said at least one print governance rule being used to reduce printing costs for at least one of the plurality of printing systems in the enterprise printing system.

10 Claims, 5 Drawing Sheets

| ASSET NUMBER (12) | MANUFACTURER (14) | MODEL NAME (16) | SERIAL NUMBER (18) | PAGE COUNT / VOLUME DATA (20) | COLOR / COLOR USAGE (22) | DUPLEX / DUPLEX PRINTING (24) | JOB COMPLETION TIME / TIME OF DAY PRINTING (26) |
|---|---|---|---|---|---|---|---|
| 0000024260D4 | XEROX | WORKCENTRE PRO C3545 | TFN689022 | 14 | TRUE | FALSE | 22-JAN-2008 07:11 AM |
| 0000024260D4 | XEROX | WORKCENTRE PRO C3545 | TFN689022 | 1 | TRUE | FALSE | 22-JAN-2008 07:09 AM |
| 0000024260D4 | XEROX | WORKCENTRE PRO C3545 | TFN689022 | 2 | FALSE | FALSE | 21-JAN-2008 10:04 PM |
| 0000024260D4 | XEROX | WORKCENTRE PRO C3545 | TFN689022 | 1 | FALSE | FALSE | 21-JAN-2008 09:55 PM |
| 0000024260D4 | XEROX | WORKCENTRE PRO C3545 | TFN689022 | 2 | FALSE | FALSE | 21-JAN-2008 09:47 PM |
| 0000024260D4 | XEROX | WORKCENTRE PRO C3545 | TFN689022 | 1 | TRUE | FALSE | 22-JAN-2008 08:15 AM |
| 0000024260D4 | XEROX | WORKCENTRE PRO C3545 | TFN689022 | 2758 | TRUE | TRUE | 21-JAN-2008 05:50 PM |
| 0000024260D4 | XEROX | WORKCENTRE PRO C3545 | TFN689022 | 2 | TRUE | FALSE | 21-JAN-2008 04:31 PM |
| 0000024260D4 | XEROX | WORKCENTRE PRO C3545 | TFN689022 | 8 | TRUE | TRUE | 21-JAN-2008 04:03 PM |
| 0000024260D4 | XEROX | WORKCENTRE PRO C3545 | TFN689022 | 39 | TRUE | TRUE | 21-JAN-2008 03:33 PM |
| 0000024260D4 | XEROX | WORKCENTRE PRO C3545 | TFN689022 | 39 | TRUE | TRUE | 21-JAN-2008 03:24 PM |
| 0000024260D4 | XEROX | WORKCENTRE PRO C3545 | TFN689022 | 4 | TRUE | TRUE | 21-JAN-2008 03:27 PM |
| 0000024260D4 | XEROX | WORKCENTRE PRO C3545 | TFN689022 | 33 | TRUE | TRUE | 21-JAN-2008 03:26 PM |
| 0000024260D4 | XEROX | WORKCENTRE PRO C3545 | TFN689022 | 4 | TRUE | FALSE | 21-JAN-2008 03:16 PM |
| 0000024260D4 | XEROX | WORKCENTRE PRO C3545 | TFN689022 | 24 | TRUE | FALSE | 21-JAN-2008 02:14 PM |
| 0000024260D4 | XEROX | WORKCENTRE PRO C3545 | TFN689022 | 1 | TRUE | TRUE | 21-JAN-2008 01:46 PM |
| 0000024260D4 | XEROX | WORKCENTRE PRO C3545 | TFN689022 | 3 | TRUE | FALSE | 21-JAN-2008 01:36 PM |

UNIQUELY IDENTIFY PRINT DEVICE FOR POLICY ASSIGNMENT

| ASSET NUMBER | MANUFACTURER | MODEL NAME | SERIAL NUMBER | PAGE COUNT | COLOR | DUPLEX | JOB COMPLETION TIME |
|---|---|---|---|---|---|---|---|
| 00000024260D4 | XEROX | WORKCENTRE PRO C3545 | TFN698022 | 14 | TRUE | FALSE | 22-JAN-2008 07:11 AM |
| 00000024260D4 | XEROX | WORKCENTRE PRO C3545 | TFN698022 | 1 | TRUE | FALSE | 22-JAN-2008 07:09 AM |
| 00000024260D4 | XEROX | WORKCENTRE PRO C3545 | TFN698022 | 2 | FALSE | FALSE | 21-JAN-2008 10:04 PM |
| 00000024260D4 | XEROX | WORKCENTRE PRO C3545 | TFN698022 | 1 | FALSE | FALSE | 21-JAN-2008 09:55 PM |
| 00000024260D4 | XEROX | WORKCENTRE PRO C3545 | TFN698022 | 2 | FALSE | FALSE | 21-JAN-2008 09:47 PM |
| 00000024260D4 | XEROX | WORKCENTRE PRO C3545 | TFN698022 | 1 | TRUE | FALSE | 22-JAN-2008 08:15 AM |
| 00000024260D4 | XEROX | WORKCENTRE PRO C3545 | TFN698022 | 2758 | TRUE | TRUE | 21-JAN-2008 05:50 PM |
| 00000024260D4 | XEROX | WORKCENTRE PRO C3545 | TFN698022 | 2 | TRUE | FALSE | 21-JAN-2008 04:31 PM |
| 00000024260D4 | XEROX | WORKCENTRE PRO C3545 | TFN698022 | 8 | TRUE | TRUE | 21-JAN-2008 04:03 PM |
| 00000024260D4 | XEROX | WORKCENTRE PRO C3545 | TFN698022 | 39 | TRUE | TRUE | 21-JAN-2008 03:33 PM |
| 00000024260D4 | XEROX | WORKCENTRE PRO C3545 | TFN698022 | 39 | TRUE | TRUE | 21-JAN-2008 03:24 PM |
| 00000024260D4 | XEROX | WORKCENTRE PRO C3545 | TFN698022 | 4 | TRUE | TRUE | 21-JAN-2008 03:27 PM |
| 00000024260D4 | XEROX | WORKCENTRE PRO C3545 | TFN698022 | 33 | TRUE | TRUE | 21-JAN-2008 03:26 PM |
| 00000024260D4 | XEROX | WORKCENTRE PRO C3545 | TFN698022 | 4 | TRUE | FALSE | 21-JAN-2008 03:16 PM |
| 00000024260D4 | XEROX | WORKCENTRE PRO C3545 | TFN698022 | 24 | TRUE | FALSE | 21-JAN-2008 02:14 PM |
| 00000024260D4 | XEROX | WORKCENTRE PRO C3545 | TFN698022 | 1 | TRUE | TRUE | 21-JAN-2008 01:46 PM |
| 00000024260D4 | XEROX | WORKCENTRE PRO C3545 | TFN698022 | 3 | TRUE | FALSE | 21-JAN-2008 01:36 PM |

FIG. 1

| SERIAL NUMBER | MANUFACTURER | MODEL NAME | COLOR | METER NAME | START METER READ | END METER READ | COST PER IMPRESSION |
|---|---|---|---|---|---|---|---|
| AUA332477 | XEROX | PHASER 7760 | TRUE | COLOR IMPRESSIONS | 1078 | 3099 | $ 0.06000 |
| AUA332477 | XEROX | PHASER 7760 | TRUE | BLACK IMPRESSIONS | 542 | 542 | $ 0.02000 |
| L99026355 | XEROX | PHASER 7760 | TRUE | COLOR IMPRESSIONS | 180546 | 209654 | $ 0.06000 |
| L99026355 | XEROX | PHASER 7760 | TRUE | BLACK IMPRESSIONS | 643 | 798 | $ 0.02000 |
| VVK002681 | XEROX | PHASER 7760 | TRUE | COLOR IMPRESSIONS | 10794 | 11789 | $ 0.06000 |
| VVK002681 | XEROX | PHASER 7760 | TRUE | BLACK IMPRESSIONS | 435 | 809 | $ 0.02000 |
| VVK002681 | XEROX | WORKCENTRE 4150 | FALSE | BLACK IMPRESSIONS | 17658 | 26800 | $ 0.03000 |

Printers — Table Preferences

Find [____] in [IP Address ▼] [Go]

| Select All | Icon | Printer Status ▲ [All ▼] | IP Address | Printer Model [All ▼] | Serial Number | Print Policy Plan |
|---|---|---|---|---|---|---|
| ☐ | ⚠ | Toner/Ink Low | 13.121.241.13 | Xerox WorkCentre 7345 | FKA4620531 | XGS GTOD Print Controls Policy Plan |
| ☐ | ⚠ | Out of Paper | 13.121.241.10 | Xerox WorkCentre Pro C3545 | TFN669902 | 3545 Color Printers |
| ☐ | ⚠ | Low Paper | 13.249.151.151 | Xerox WorkCentre 7345 | FKA624354 | XGS GTOD Print Controls Policy Plan |
| ☐ | ⚠ | Input Tray Empty | 13.121.241.11 | Xerox WorkCentre Pro 255 | UTV868050 | XGS GTOD Print Controls Policy Plan |
| ☐ | ⊘ | Up and Running | 13.249.140.216 | Xerox WorkCentre Pro 265 | UTU101964W | XGS GTOD Print Controls Policy Plan |
| ☐ | ⊘ | Up and Running | 13.121.246.216 | Xerox WorkCentre 7345 | FKA623964 | XGS GTOD Print Controls Policy Plan |
| ☐ | ⊘ | Printing | 13.121.241.12 | Xerox WorkCentre Pro C3545 | TFN687611 | 3545 Color Printers |
| ☐ | ⊘ | Up and Running | 13.121.238.55 | Xerox WorkCentre 7665 v1 Multifunction System | VDR533389 | |

Page [1 ▼] of 1 ▶  Show [25 ▼] per page  Total: 8

Print Control Rules — Table Preferences

Find [____] in [Date Last Edited ▼] [Go]

| Select All | Rule Name | Enabled [All ▼] | Description | Date Last Edited | Impressions | Sides [All ▼] | Color [All ▼] |
|---|---|---|---|---|---|---|---|
| ☐ | Reject - Color - E-Mails (MS Outlook) | Yes | | 5/13/2009 3:54 PM | - | - | Color |
| ☐ | Reject - Any Document 4 Pages or more that is single sided | Yes | | 4/19/2009 9:35 AM | Greater than 3 | 1 Sided | - |
| ☐ | Warning - Document printing during non-business hours | Yes | | 5/14/2009 9:12 AM | - | - | - |
| ☐ | Warning - Document - Over 100 Pages | Yes | | 4/15/2009 11:17 AM | Greater than 99 | - | - |

Page [1 ▼] of 1 ▶  Show [25 ▼] per page  Total: 4

*70, 72*

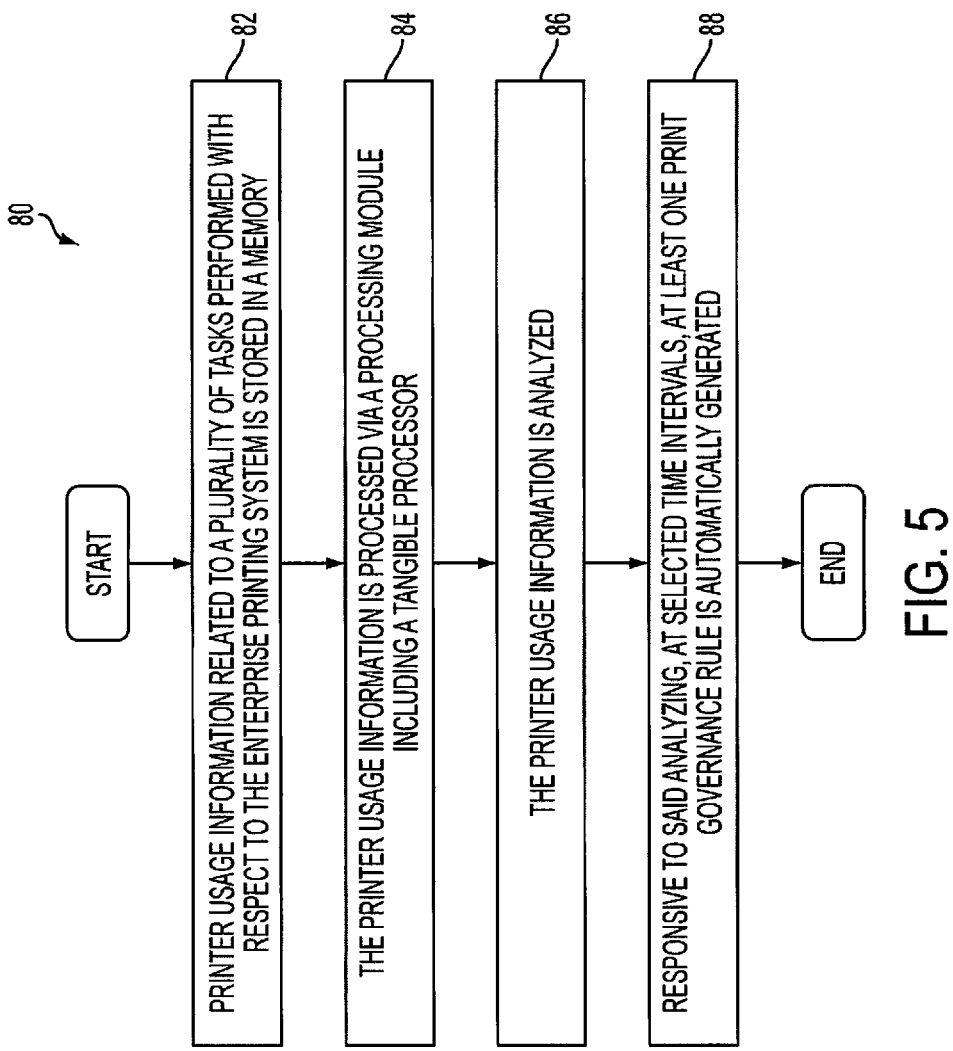

METHOD AND SYSTEM FOR AUTOMATICALLY CREATING PRINT GOVERNANCE RULES AND POLICIES

CROSS-REFERENCE TO RELATED APPLICATIONS

This application is related to commonly-assigned pending U.S. patent application Ser. No. 12/364,156 filed on Feb. 2, 2009 entitled "METHOD AND SYSTEM FOR TRACKING DATA BASED ON GOVERNANCE RULES AND POLICIES" and U.S. patent application Ser. No. 12/428,862 filed on Apr. 23, 2009, entitled "METHOD AND SYSTEM FOR MONITORING USAGE POLICY BY MANIPULATING USAGE GOVERNANCE LOGS," the full disclosures of which are incorporated herein by reference.

BACKGROUND

1. Field of the Related Art

The present disclosure relates to print management systems and paper-reducing technologies, and more particularly, to a method and system for automatically creating print governance rules and policies.

2. Background of the Related Art

Organizations such as business enterprises, educational, government and medical institutions often have large expenditures relating to printing paper documents, and often experience difficulty with control over the flow of information by printed documents, as the print volume of multifunctional systems has risen sharply in recent years. In the printing context, the main issue is the cost-per-page of high-performance multifunctional systems. In most entities, attempts to control high-performance multifunctional system print volumes and the associated cost increases have been largely unsuccessful. To make matters worse, potential environmental issues with high-performance multifunctional system are becoming a concern. Resolving these issues is a top priority among IT professionals and the corporations that employ a plurality of multifunctional systems for their business needs.

Furthermore, photocopiers continue to advance in terms of the functionality and flexibility they provide. For example, rather than being stand alone machines as they once were, many copy machines now have digital processing capabilities and network interfaces which allow them to be connected to a computer network. This provides a variety of advantages. One such advantage is that the copiers may be used as multi-function devices (MFDs) not only for performing traditional photocopying, but also for printing documents generated by computers connected to the network. Moreover, where copiers are connected to a computer network, it becomes possible to collect status and usage information from the computers remotely via a network server or other network terminal. Another advantageous aspect of having networked copiers or MFDs is the ability to monitor and account for the usage of such MFDs.

In general, an MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission capabilities combined with their functionality, it would be useful to automatically generate a plurality of rules and/or policies related to the usage of such MFDs, without the need of a system administrator manually creating such processes, which are prone to human error. Thus, proactively detecting issues related to governance rules and/or policies can be problematic and time consuming for system administrators of output management solutions.

However, ensuring smooth deployment of an output management solution at a customer environment is required to maintain user productivity, while meeting the customers' service level agreement expectations. This can be a difficult process to manage, especially when print governance policies and/or rules are being manually applied by a system administrator. Any gaps in governance could result in missed cost savings. Policies and/or rules need to be created, and applied to the print devices under management. These policies and/or rules are essential to controlling print, and meeting the cost savings promised in the services agreement. But generating these rules and/or policies is a time consuming manual process. Even if assessment data is available, it still needs to be studied and summarized.

Consequently, in conventional systems, there is no method and system for automatically creating governance rules and/or policies from pre-existing MFD information. The present disclosure is intended to overcome the drawbacks of other methods and systems by providing for an effective print/scan/copy/fax job tracking/monitoring/controlling/system and method by automatically generating governance rules and/or policies related to the plurality of users and the plurality of MFDs within a network of MFDs.

SUMMARY

The present disclosure provides a system for accommodating a plurality of printing systems arranged as an enterprise printing system including a memory for storing printer usage information related to a plurality of tasks performed with respect to the enterprise printing system and a processing module including a tangible processor; said tangible processor (1) analyzing the printer usage information and (2) responsive to said analyzing, automatically generating, at selected time intervals, at least one print governance rule, said at least one print governance rule being used to reduce printing costs for at least one of the plurality of printing systems in the enterprise printing system.

The present disclosure also provides a method for accommodating a plurality of printing systems arranged as an enterprise printing system including storing in a memory printer usage information related to a plurality of tasks performed with respect to the enterprise printing system; processing the printer usage information via a processing module including a tangible processor; analyzing the printer usage information and responsive to said analyzing, automatically generating, at selected time intervals, at least one print governance rule, said at least one print governance rule being used to reduce printing costs for at least one of a plurality of printing systems arranged as an enterprise system.

The present disclosure also provides a system for accommodating a plurality of printing systems arranged as an enterprise printing system, including a computing device; a computer-readable storage medium in communication with the computing device, the computer-readable storage medium comprising one or more programming instructions for: storing in a memory printer usage information related to a plurality of tasks performed with respect to the enterprise printing system; processing the printer usage information via a processing module including a tangible processor; analyzing the printer usage information; and responsive to said analyzing, automatically generating, at selected time intervals, at least one print governance rule, said at least one print governance rule being used to reduce printing costs for at least one of a plurality of printing systems arranged as an enterprise system.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein:

FIG. 1 is a table including user-based print job tracking data used as a source for the automatic creation of rules and/or policies, in accordance with the present disclosure;

FIG. 2 is a table including printer asset meter and cost data used as a source for the automatic creation of rules and/or policies, in accordance with the present disclosure;

FIGS. 4A and 4B are screenshots of print policies and/or rules when incorporated into an output management solution, in accordance with the present disclosure; and FIG. 5 is a flowchart illustrating a print policy and/or rule creation process, in accordance with the present disclosure.

DETAILED DESCRIPTION

Figure 3:
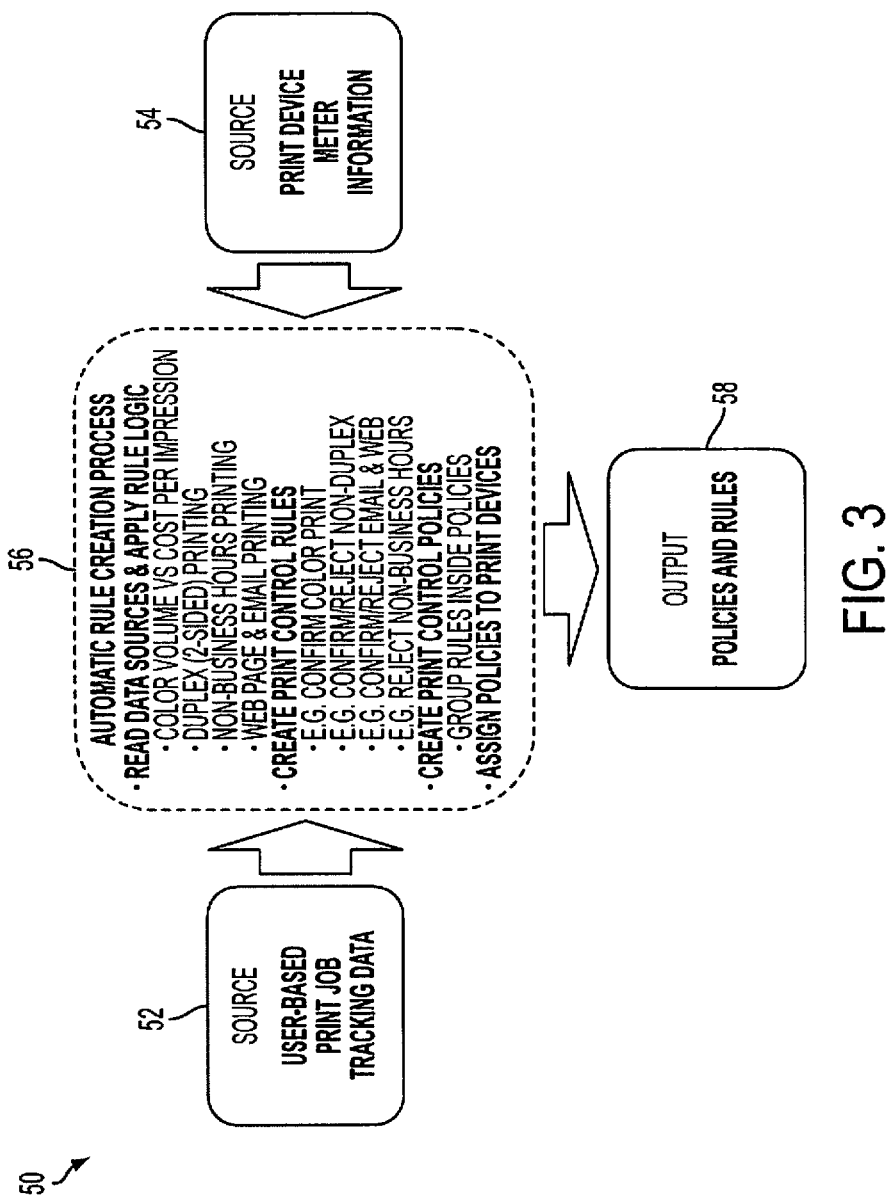
FIG. 3 is a schematic diagram of a print policy and/or rule creation process, in accordance with the present disclosure.

The present disclosure proposes automating the creation or generation of print policies and/or rules by leveraging information that is already available at an account, such as print job tracking data and asset (print device) information. Data sources may be leveraged to analyze print behavior. Such data sources may include: (i) a user-based job tracking data source and (ii) a print device meter and asset data source. Additionally, print governance rules may be automatically created or generated based upon print behavior or usage where rules are grouped into print policies and where each printer is assigned at least one print policy.

The present disclosure further proposes a method of automatically establishing an initial set of print policies and/or rules when deploying an enterprise output management solution. The method harvests existing printer usage information (typically gathered during an assessment phase) and printer running cost data to determine the current state of user behavior(s). The method then instantiates rules to encourage a reduction in printing costs. These rules require users to confirm costly practices or require job programming changes to reduce costs (e.g., duplex printing, monochrome printing). The initial values chosen for the rules are designed to be improvements over the current processes.

The present disclosure further provides a computer network and related methods which generate MFD usage information that may be analyzed to determine a more efficient allocation of MFD resources and, consequently, promotes more responsible use and a better understanding of printing costs related to the plurality of MFDs. Print assessments can uncover many costs associated with printing and output and they reveal how customers are using their office equipment. The goal is to tailor an entity's printing and output solution to its specific needs. By performing a print/output assessment, an entity (such as a company or organization) may be able to reduce the amount of output devices on the network, leading to greater efficiency and service levels throughout the entity.

The exemplary embodiments of the present disclosure present a package that is distributed to clients by authorized dealers and facilitates entity-wide assessment, management, and control of copier and printing costs as well as cost optimization. The printing system of the present disclosure measures/monitors/tracks and generates an analysis of the customer's device fleet (such as MFDs) performance by using built-in reporting, tracking, analyzing, and updating modules. The resulting data enables the creation of service strategies and billing models tailored to an entity's goals. The copier and printer cost evaluation can be measured by using various criteria such as user, department, project, and client or machine number. All print jobs can be classified by volume and user and it is also possible to correctly differentiate between color and black and white jobs, paper formats, and paper types. As a result, this is a dynamic printing system because it is updated selectively, dynamically, and automatically in accordance with input received from the users.

Prior to describing the present disclosure in further detail, it will first be helpful to define various terms that will be used throughout the following discussion. For example:

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

As used herein, "print job" is not limited to a particular electronic format, such as a bitmap, but can include any suitable format including PDF, word processor formats, rich text (RTF), etc., as will be appreciated by those skilled in the art.

The term "task" refers to a print, scan, copy, and/or fax job or any type of function that may be performed by an MFD. The term "task" may also refer to an execution path through address space, such as a set of program instructions that are loaded in a data storage means. The term "task" may also refer to a basic unit of programming that an operating system controls and depending on how the operating system defines a task in its design, this unit of programming may be an entire program or each successive invocation of a program.

The term "output governance rules" refers to a principle or condition that governs an output task related to a plurality of MFDs.

The term "module" may refer to a self-contained component (unit or item) that is used in combination with other components and/or a separate and distinct unit of hardware or software that may be used as a component in a system, such as a printing system including a plurality of MFDs. The term "module" may also refer to a self-contained assembly of electronic components and circuitry, such as a stage in a computer that is installed as a unit.

The term "rule" may refer to a principle and/or condition where one or more MFDs are caused to perform one or more requested tasks according to a preset/predetermined default mode as a result of the principles and/or conditions when the task is requested. The term "rule" may also refer to a prescribed guide for action for the plurality of MFDs. Examples of rules may include, but are not limited to: allow only certain users to print in color, allow only certain users to print black and white, allow only certain users to make more than a preset amount of copies per printer, allow only certain users to scan or fax or copy, allow only certain users to print graphics, allow most users to print text, allow only certain users to print information from the Internet, allow only certain users to print single sided, allow only certain users to print unlimited information, allow a set amount of print jobs from a terminal to one MFD or to a plurality of MFDs, allow for switching of MFDs when a quota has been reached, allow for denial of access to any of the MFDs, allow for counting the number of pages printed from each terminal to any permissible MFD, etc.

The term "analyze" may refer to determining the elements or essential features or functions or processes of a plurality of MFDs and/or to subject the plurality of MFDs to computational processing. The term "analyze" may further refer to tracking data and/or collecting data and/or manipulating data and/or examining data and/or updating data on a real-time basis in an automatic manner and/or a selective manner and/or manual manner.

The term "behavior" may refer to any type of responses or actions received from one or more users interacting with one or more MFDs and/or any type of pattern of actions. The term "behavior" may also refer to any type of process of gathering/collecting information about an individual's behavior when interacting with one or more MFDs.

Embodiments will be described below while referencing the accompanying figures. The accompanying figures are merely examples and are not intended to limit the scope of the present disclosure.

With reference to FIG. 1, there is presented a table including user-based print job tracking data used as a source for the automatic creation of rules and/or policies, in accordance with the present disclosure.

The table 10 includes a plurality of columns. The columns may include data related, but not limited to, the following categories: asset number 12, manufacturer 14, model name 16, serial number 18, page count 20, color 22, duplex 24, and job completion time 26.

Successfully automating the creation of print policies and rules is dependent upon sources of print behavior and print device data. Such data is presented in table 10. The present disclosure leverages two common sources of data. These are (i) user-based print job tracking data and (ii) print device meter and asset data. User-based print job tracking data is usually available, as most enterprises already track print usage. However, such data may be obtained during the assessment phase of a managed print services deployment. Managed print services providers often collect detailed information about a print environment before making recommendations to the customer. The print device meter and asset data will be described below with reference to FIG. 2.

Additionally, the automatically generated results may be stored separately in a local or remote database for further processing. This may be a unique database designed solely for storing and analyzing such automatically generated data (e.g., rules and/or policies). Also, once a history of the generated rules is collected and stored for each of the plurality of MFDs, that history may be evaluated in the future for determining which rule/policy generated needs to be modified in order to achieve the best desired results for each MFD. In other words, the rule changes that took place for each MFD may be stored and later compared against each other (for the same MFD) and ranked in order of best achieved results. The highest ranked rules for one MFD may be used in changing the rules/policies of other MFDs.

The present disclosure enables efficient gathering of data related to the plurality of users and/or the plurality of MFDs by aiding a system administrator (or a plurality of users) in determining the amount spent on each MFD by each user or the amount spent by one user on a plurality of MFDs. In addition, the plurality of users are empowered and educated to better understand alternative strategies when printing to a plurality of MFDs. Thus, the plurality of rules and the plurality of policies automatically generated by a processing module may be sent directly to the plurality of users. The plurality of users may be (i) notified of compliance or non-compliance with respect to the plurality of rules and the plurality of policies and (ii) notified of usage behavior modification strategies when non-compliance is determined.

With reference to FIG. 2, there is presented a table including printer asset meter and cost data used as a source for the automatic creation of rules and/or policies, in accordance with the present disclosure.

The table 30 includes a plurality of columns. The columns may include data related, but not limited to, the following categories: serial number 32, manufacturer 34, model name 36, color 38, meter name 40, start meter read 42, end meter read 44, and cost per impression 46.

Successfully automating the creation or generation of print policies and/or rules is dependent upon sources of print behavior and print device data. Such data is presented in table 30. The present disclosure leverages two common sources of data. These are (i) user-based print job tracking data and (ii) print device meter and asset data. Print device meter and asset data is readily available, as enterprises are already tracking print devices throughout their lifecycle, and using print device meter reads to perform billing procedures.

Additionally, the rules and/or policies may be modified and/or updated by an authorized user or by a plurality of authorized users at any desirable time for any of the plurality of MFDs. In other words, an authorized user may modify all the rules or a portion of the rules for only one MFD or for a group of MFDs or for all MFDs. Thus, certain MFDs may have different rules than other MFDs based on their usage, geographical location, and/or user access requirements even though such MFDs may be located in a single location or be part of the same group of MFDs.

With reference to FIG. 3, there is presented a schematic diagram of a print policy and/or rule creation process, in accordance with the present disclosure.

The policies and rules process 50 includes a first source 52 and a second source 54. The automatic rule creation process 56 is generated from the first source 52 and the second source 54 in order to output rules and policies 56. The first source 52 may be a user-based print job tracking data source and the second source 54 may be a print device meter information source.

Thus, concerning the print policy and rule creation process 50, a variety of different data may be used to create such rules and policies 56. With the two sources of data 52, 54, analysis can be performed and intelligent conclusions reached about the print environment. This process is the basis of the automatic print policy and rule creation 50.

In a first step of the policy and rule creation process 50, data sources 52, 54 may be read. For example: (a) color volume may be analyzed across all the color print devices. In other words, the most expensive color devices (e.g., those with a cost per color impression of greater than 75% or more of the total population) are marked as candidates for a color print rule, (b) duplex (2-sided) printing behavior may be analyzed across all print devices. In other words, if less than 50% of print jobs greater than 2 pages utilize duplex, then all print devices are marked as candidates for a duplex print rule, (c) non-business hours printing is analyzed across all print devices. In other words, any print devices with non-business hours print behavior are marked as a candidate for a non-business hours print rule, (d) web page and email printing. In other words, if more than 10% of print jobs are web pages or email, then all print devices are marked as candidates for a duplex print rule.

In a second step, print control rules are created. Such rules may include, but are not limited to: confirm color print, confirm/reject non-duplex, confirm/reject email and web, and reject non-business hours.

In a third step, print control policies are created. Each policy may include a group of rules. For example, one or more print rules may be combined into a single print policy and rules may be grouped based upon print device commonality.

In a fourth step, policies to print devices are assigned. For example, print policies are assigned to the MFD devices.

With reference to FIG. 4A and 4B, there is presented screenshots of print policies and rules when incorporated into an output management solution, in accordance with the present disclosure.

In FIG. 4A, screenshot 60 illustrates print policy plans 62 automatically generated by manipulating the first source 52 and the second source 54. In FIG. 4B, screenshot 70 illustrates rules 72 automatically created by manipulating the first source 52 and the second source 54.

The output governance rules are configured in the output management software for the governance of at least printing, copying, faxing, and scanning in the enterprise. These rules are often associated with an MFD or groups of MFDs. They can be configured to control printing at the user level (groups of users in departments). In large-scale deployments, configuration and management of these rules can be a very complex task. However, the exemplary embodiments allow for ease of data flow and efficient operation through the use of rules and/or policies designed and generated specifically for users and MFDs.

One example of a rule could be the conversion of specific internal reports from a one-sided format and print device to a double-sided format and print device. This reduces paper costs by 50%. Software code could offer a number of optimization routines in which a project manager determines which ones are relevant for his/her entity. Theoretically, the software code could offer the option to define the maximum print and/or copier budget in a given month for each or a selected user.

Another example of a rule could be that each MFD may be operated in accordance with a particular set of rules. By way of example, if a user has reached his weekly quota of copies, the MFD may be disabled for that user. Also, if someone is trying to make too many copies on a low volume MFD, he/she is told to move to a higher-volume MFD. Another rule may be if it is a weekend, then color copying is disabled from one or more or all MFDs.

In another example, in certain networks or environments, MFDs may be organized into logical groups of various levels. Users of one group may be restricted from using MFDs in a different group depending on use permissions or access rights, for example. Each user is assigned a set of access levels. For instance, a member of the executive group may have access to any of the company MFDs worldwide, and an administrative group member may only have access to local MFDs, and a member of the apprentice group may only have permission to do black and white copying. As a result, rules and/or policies may be formed that apply to specific groups of MFDs, and each MFD or group of MFDs may have a different set of rules and/or policies depending on a variety of factors, such as level of authority within an entity.

In another example, the managed print services provider may take the following actions. For instance, users may be added to policy/rule if needed. The system may have to check with the customer on the user's role within a department. Also, print devices may be checked for being in-scope. If they are in-scope, then their contract and entitlement may be reviewed either manually or automatically. Furthermore, print devices (such as MFDs) may be added to policy/rule if needed. The managed print services provider ensures that gap checking is occurring daily or hourly or in real-time so that gaps like these can be identified and corrected immediately by a system administrator.

It is further contemplated that any software that governs printing in an enterprise environment by using print policies and/or rules can leverage this aspect of the present disclosure (i.e., automatic print governance creation/generation and alerting). For example, for each print governance policy automatically generated, one or more visual or audio alerts may be created. The one or more alerts may be a notification to the administrator(s) or the plurality of users of the activity related to the policy, or specifically any rule in the policy. Additionally, the administrator(s) or the plurality of users of the output management software may select the policies or rules within the policies for which they'd like to enable alerts.

With reference to FIG. 5, there is presented a flowchart illustrating a print policy and/or rule creation process, in accordance with the present disclosure.

The flowchart 80 includes the following steps. In step 82, printer usage information related to a plurality of tasks performed with respect to the enterprise printing system is stored in a memory. In step 84, the printer usage information is processed via a processing module including a tangible processor. In step 86, the printer usage information is analyzed. In step 88, responsive to said analyzing, at selected time intervals, at least one print governance rule is automatically generated, said at least one print governance rule being used to reduce printing costs for at least one of a plurality of printing systems arranged as an enterprise system. The process then ends.

The benefits of the present disclosure may include: (i) saving time and automating initial set-up of print policies and/or rules, (ii) promised cost savings can be achieved sooner, (iii) administrators do not have to sort through potentially thousands of print job entries to identify print activity, and (iv) optimum configuration is achieved in shorter amounts of time due to fewer iterations.

The present disclosure proposes an alternative method that takes advantage of governance rules automatically generated based on data tracking/monitoring/collecting capabilities. The approaches described above provide any service provider with several approaches for tracking data and automatically generating governance rules and/or policies. Furthermore, the concept of applying and generating governance rules and/or policies to data received from a plurality of MFDs is a general concept in that it can be used for any type of applications contemplated by one skilled in the art. For example, any service provider could provide/control/own/sell the MFDs. In addition, service providers could use any type of printer and/or MFD and/or electronic device to achieve the desired results of the present disclosure. The printing system makes it easier for information technology (IT) groups and/or service providers to manage the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printer management system for accommodating a plurality of printing systems arranged as an enterprise printing system, the printer management system comprising: (1) a memory for storing printer usage information related to a plurality of tasks performed with respect to the enterprise printing system and (2) an existing print governance rule for the printing system; and a processing module including a tangible processor; said tangible processor (1) analyzing the printer usage information including (i) user-based print job tracking information and (ii) print device meter and asset information and (2) responsive to said analyzing of both the tracking information and the device meter and asset information, automatically generating, at selected time intervals, at least one new print governance rule comprising a change of the existing print governance rule, said at least one new print governance rule being used to reduce printing costs for at least one of the plurality of printing systems in the enterprise printing system.

2. The printer management system according to claim 1, wherein said at least one new print governance rule is used to reduce printing costs by requiring a user of the print enterprise system to confirm a selected action to be taken at one of the plurality of printing systems prior to performing said selected action.

3. The printer management system according to claim 1, in which a user of one of the plurality of printing systems provides a job program with a plurality of job programming instructions, wherein said at least one new print governance rule is used to reduce printing costs by requiring the user to change at least one of the job programming instructions.

4. The printer management system according to claim 1, wherein the user-based print job tracking information includes one or more of the following: asset number data, manufacturer data, model name data, serial number data, page count data, color data, duplex printing data, and job completion time data.

5. The printer management system according to claim 1, wherein the print device meter and asset information includes one or more of the following: serial number data, manufacturer data, model name data, color data, meter name data, start meter read data, end meter read data, and cost per impression data.

6. The printer management system according to claim 1, wherein the plurality of rules are selectively grouped into a plurality of policies.

7. The printer management system according to claim 6, wherein each of the plurality of printing systems is assigned at least one policy of the plurality of policies.

8. The printer management system according to claim 7, wherein the plurality of rules and the plurality of policies are further based on usage behaviors of the plurality of users.

9. The printer management system according to claim 8, wherein the plurality of rules and the plurality of policies automatically generated by the processing module are sent directly to the plurality of users; and wherein the plurality of users are (i) notified of compliance or non-compliance with respect to the plurality of rules and the plurality of policies and (ii) notified of usage behavior modification strategies when non-compliance is determined.

10. A printer management system for accommodating a plurality of printing systems arranged as an enterprise printing system, the system comprising: a computing device; a computer-readable storage medium in communication with the computing device, the computer-readable storage medium comprising one or more programming instructions for: storing in a memory printer usage information related to a plurality of tasks performed with respect to the enterprise printing system comprising (i) user-based print job tracking information and (ii) print device meter and asset information; processing the printer usage information via a processing module including a tangible processor; analyzing the printer usage information; and responsive to said analyzing of both the tracking information and the device meter and asset information, automatically generating, at selected time intervals, at least one print governance rule, said at least one print governance rule being used to reduce printing costs for at least one of a plurality of printing systems arranged as an enterprise system.

* * * * *